(12) United States Patent
DaCosta et al.

(10) Patent No.: US 8,828,325 B2
(45) Date of Patent: Sep. 9, 2014

(54) EXHAUST SYSTEM HAVING CATALYTICALLY ACTIVE PARTICULATE FILTER

(75) Inventors: Herbert Florey Martins DaCosta, Peoria, IL (US); Thomas Edward Paulson, Groveland, IL (US); Svetlana Mikhailovna Zemskova, Edelstein, IL (US); James Joshua Driscoll, Dunlap, IL (US); Wade James Robel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 2192 days.

(21) Appl. No.: 11/896,435

(22) Filed: Aug. 31, 2007

(65) Prior Publication Data
US 2009/0056320 A1 Mar. 5, 2009

(51) Int. Cl.
*B01J 27/24* (2006.01)
*B01D 53/94* (2006.01)
*F01N 3/035* (2006.01)
*B01J 23/38* (2006.01)
*B01J 37/02* (2006.01)

(52) U.S. Cl.
CPC .............. *F01N 3/035* (2013.01); *B01J 23/38* (2013.01); *B01J 27/24* (2013.01); *B01J 37/0225* (2013.01); *F01N 2250/02* (2013.01)
USPC ......................................... 422/180; 502/200

(58) Field of Classification Search
USPC .............. 422/180; 502/200, 201; 60/299
See application file for complete search history.

(56) References Cited

U.S. PATENT DOCUMENTS

| | | | |
|---|---|---|---|
| 2,050,298 A | | 8/1936 | Everett |
| 2,382,845 A | * | 8/1945 | Arnold et al. ................. 423/406 |
| 3,277,564 A | | 10/1966 | Webber et al. |
| 3,394,213 A | | 7/1968 | Roberts et al. |
| 3,416,891 A | * | 12/1968 | Paris et al. ..................... 502/200 |
| 3,920,583 A | | 11/1975 | Pugh |
| 4,126,560 A | | 11/1978 | Marcus et al. |
| 4,452,854 A | | 6/1984 | Merriam et al. |
| 4,752,623 A | | 6/1988 | Stevens et al. |
| 4,810,587 A | | 3/1989 | Losfeld et al. |
| 4,912,077 A | | 3/1990 | Lachman et al. |
| 4,975,394 A | * | 12/1990 | Kanzaki et al. ............. 501/96.5 |
| 5,068,057 A | | 11/1991 | Gustafson et al. |

(Continued)

FOREIGN PATENT DOCUMENTS

| | | |
|---|---|---|
| EP | 0 754 516 A3 | 1/1997 |
| GB | 1190844 | 5/1970 |

(Continued)

OTHER PUBLICATIONS

S.S. Tan, et al., "Kinetic Modelling for Photosynthesis of Hydrogen and Methane Through Catalytic Reduction of Carbon Dioxide With Water Vapour," *Catalysis Today*, pp. 1-5, 2007.

(Continued)

*Primary Examiner* — Jill Warden
*Assistant Examiner* — Joye L Woodard
(74) *Attorney, Agent, or Firm* — Finnegan, Henderson, Farabow, Garrett & Dunner LLP

(57) ABSTRACT

A catalyst is disclosed. The catalyst contains a ternary nitride and at least one of gold, osmium, iridium, palladium, rhodium, rhenium, ruthenium, or cesium. The catalyst may be used for a particulate filter in an engine exhaust treatment system.

18 Claims, 1 Drawing Sheet

(56) References Cited

U.S. PATENT DOCUMENTS

| | | | |
|---|---|---|---|
| 5,204,067 | A | 4/1993 | Haerle |
| 5,207,734 | A | 5/1993 | Day et al. |
| 5,378,426 | A | 1/1995 | Geibel et al. |
| 5,602,062 | A * | 2/1997 | Sato et al. ............... 501/96.4 |
| 5,714,657 | A | 2/1998 | deVries |
| 5,717,985 | A | 2/1998 | Labombard et al. |
| 5,821,190 | A * | 10/1998 | Kurabayashi et al. ........ 502/178 |
| 5,961,931 | A * | 10/1999 | Ban et al. ...................... 422/171 |
| 5,980,977 | A | 11/1999 | Deng et al. |
| 6,199,364 | B1 | 3/2001 | Kendall et al. |
| 6,276,045 | B1 | 8/2001 | Büchi et al. |
| 6,330,791 | B1 | 12/2001 | Kendall et al. |
| 6,422,008 | B2 | 7/2002 | Voss et al. |
| 6,534,022 | B1 * | 3/2003 | Carlborg et al. .............. 422/180 |
| 6,558,810 | B2 | 5/2003 | Garbo |
| 6,572,682 | B2 | 6/2003 | Peter et al. |
| 6,693,138 | B2 | 2/2004 | O'Rear |
| 6,840,976 | B2 | 1/2005 | Vance et al. |
| 6,863,879 | B2 | 3/2005 | Rojey et al. |
| 6,890,962 | B1 | 5/2005 | O'Rear et al. |
| 7,010,910 | B2 | 3/2006 | Watanabe et al. |
| 7,062,904 | B1 | 6/2006 | Hu et al. |
| 7,179,430 | B1 | 2/2007 | Stobbe et al. |
| 7,208,530 | B2 | 4/2007 | Norbeck et al. |
| 2003/0029788 | A1 | 2/2003 | Denys et al. |
| 2003/0196419 | A1 | 10/2003 | Peter et al. |
| 2004/0083715 | A1 | 5/2004 | Le Leux et al. |
| 2005/0031514 | A1 | 2/2005 | Patchett et al. |
| 2005/0129601 | A1 | 6/2005 | Li et al. |
| 2005/0201916 | A1 | 9/2005 | Yavuz et al. |
| 2006/0057046 | A1 | 3/2006 | Punke et al. |
| 2006/0083672 | A1 | 4/2006 | Daly et al. |
| 2006/0179825 | A1 | 8/2006 | Hu et al. |
| 2007/0003455 | A1 | 1/2007 | Morita et al. |
| 2007/0028602 | A1 | 2/2007 | Dalla Betta et al. |
| 2007/0245717 | A1 | 10/2007 | Kang et al. |
| 2008/0044621 | A1 | 2/2008 | Strauss |
| 2008/0164459 | A1 | 7/2008 | Zuppero et al. |

FOREIGN PATENT DOCUMENTS

| | | |
|---|---|---|
| JP | 56166940 A | 12/1981 |
| JP | 1279574 | 11/1989 |
| WO | WO 01/62364 A1 | 8/2001 |
| WO | WO 01/62365 A1 | 8/2001 |

OTHER PUBLICATIONS

Xu Xiaoding et al., "Mitigation of $CO_2$ by Chemical Conversion: Plausible Chemical Reactions and Promising Products," *Energy & Fuels*, vol. 10, pp. 305-325, 1996.

C.D. Morland; "Sintered Metal Fiber Filter Medium for Liquid and Gas Filtration," *Advances in Powder Metallurgy and Particulate Materials*, vol. 5, Parts 16-19, pp. 17-153-17-166, 1996, Princeton, NJ.

W.J. Mantle et al., "Effective Thermal Conductivity of Sintered Metal Fibers," *Proceedings of the 24th Intersociety Energy Conversion Engineering Conference*, vol. 4, pp. 1871-1877, 1989, IEEE, New York, NY.

A.G. Kostornov et al., "High-Porosity Permeable Materials From Metal Fibers," *Institute of Materials Science*, No. 8 (224), pp. 44-47, Aug. 1981, Ukrainian SSR, USSR.

J.A. Gotterba et al., "Radiant Burner Technology Base: Burner Research and Development," *National Technical Information Service*, pp. 1-1-5-8, Mar. 1987, Springfield, VA.

R.P. Tolokan, et al., "Fibre Metal Thermal Barrier Systems," *Shipbuilding Technology International*, p. 3, 1987. (Abstract only).

Sata Ken'ichi et al., "Industrial Filters and Filter Technology. Recent Application Examples of Metal Filter Materials," *Piping and Process Equipment*, vol. 36, No. 10, pp. 22-32, 1996, Japan. (Abstract only).

Sato Ken'ichi, "Removal Efficiency at High Face-Velocity of Sintered-Metal-Fiber Filter for High Purity Gases," *Kuki Seijo to Kontamineshyon Kontororu Kenkyu Taikai Yokoshu*, vol. 11, pp. 157-160, 1992, Japan. (Abstract only).

J. Mermelstein et al., "Electrostatically Enhanced Stainless Steel Filters: Effect of Filter Structure and Pore Size on Particle Removal," *Aerosol Science and Technology*, vol. 36, No. 1, pp. 62-75, 2002.

H.W. Wilson, "Coming Clean on the Cost of Filtration," *Process Engineering*, vol. 76, p. 43, Jan. 1995.

W.L. Marrecau et al., "The Knitted Metal Fiber Burner: A New Generation of Surface Combustion Material for Radiant Heat and Low $NO_x$ Applications," *ASHRAE Transactions*, vol. 104, Part 1A, pp. 721-727, 1998.

H.M. Winston et al., "The Mechnism of Heat Transfer in the Evaporator Zone of the Heat Pipe," *Second International Heat Pipe Conference*, pp. 413-423, 1976, The Netherlands.

B.S. Singh et al., "Experimental Study of the Effective Thermal Conductivity of Liquid Saturated Sintered Fiber Metal Wicks," *Int. J. Heat Mass Transfer*, vol. 16, pp. 145-155, 1973, Great Britain.

B.S. Singh et al., "Non-Isothermal Liquid Flow and Heat Transfer in Sintered Metallic Porous Media," *Int. J. Heat Mass Transfer*, vol. 22, pp. 1049-1057, 1979, Great Britain.

Christopher J. Marrion et al., "Composite Fiber Structures for Catalysts and Electrodes," *Journal of Power Sources*, vol. 47, pp. 297-302, 1994.

R.O. Srinivasan, et al., "Aluminum and Reactive Element Additions to Chromium Steel Fibers for Oxidation Resistance in Surface Combustion," *Surface and Coatings Technology*, vol. 86-87, pp. 54-60, 1996.

Maire S. A. Heikkinen, et al., "Experimental Investigation of Sintered Porous Metal Filters," *J. Aerosol Sci.*, vol. 31, No. 6, pp. 721-738, 2000, Great Britain.

Daniel K. Harris, et al., "Wet Layup and Sintering of Metal-Containing Microfibrous Composites for Chemical Processing Opportunities," *Composites: Part A*, vol. 32, pp. 1117-1126, 2001.

V.N. Kilmenko, et al, "Electrical Conductivity of Permeable Sintered Materials Composed of Discrete Randomly Oriented Fibers," *Powder Metallurgy and Metal Ceramics*, vol. 40, Nos. 5-6, pp. 277-281, 2001.

I. Yuranov, et al., "Structured Combustion Catalysts Based on Sintered Metal Fibre Filters," *Applied Catalysis B: Environmental*, vol. 43, pp. 217-227, 2003.

K. Everaert, et al., "Combustion of Chlorinated Hydrocarbons in Catalyst-Coated Sintered Metal Fleece Reactors," *Journal of Chemical Technology and Biotechnology*, vol. 78, pp. 167-172, 2003.

"Sintered Metal Fiber Filter Stops Flame Fronts in Pipes," *Advanced Materials & Processes*, p. 12, Oct. 2004.

Raymond E. Schaak, et al., "Metallurgy in a Beaker: Nanoparticle Toolkit for the Rapid Low-Temperature Solution Synthesis of Functional Multimetallic Solid-State Materials," *J. Am. Chem. Soc.*, vol. 127, pp. 3506-3515, 2005.

Igor Yuranov, et al., "Zeolite/Sintered Metal Fibers Composites as Effective Structured Catalysts," *Applied Catalysis A: General*, vol. 281, pp. 55-60, 2005.

Steven Brillant, et al., "Metal Fibre Diesel Particulate Filter: Function and Technology," *SAE International*, vol. 2005-01-0580, Apr. 11-14, 2005.

Amanda E. Henkes et al., "Low-Temperature Nanoparticle-Directed Solid-State Synthesis of Ternary and Quaternary Transition Metal Oxides," *Chem. Mater*, vol. 18, pp. 567-571.

\* cited by examiner

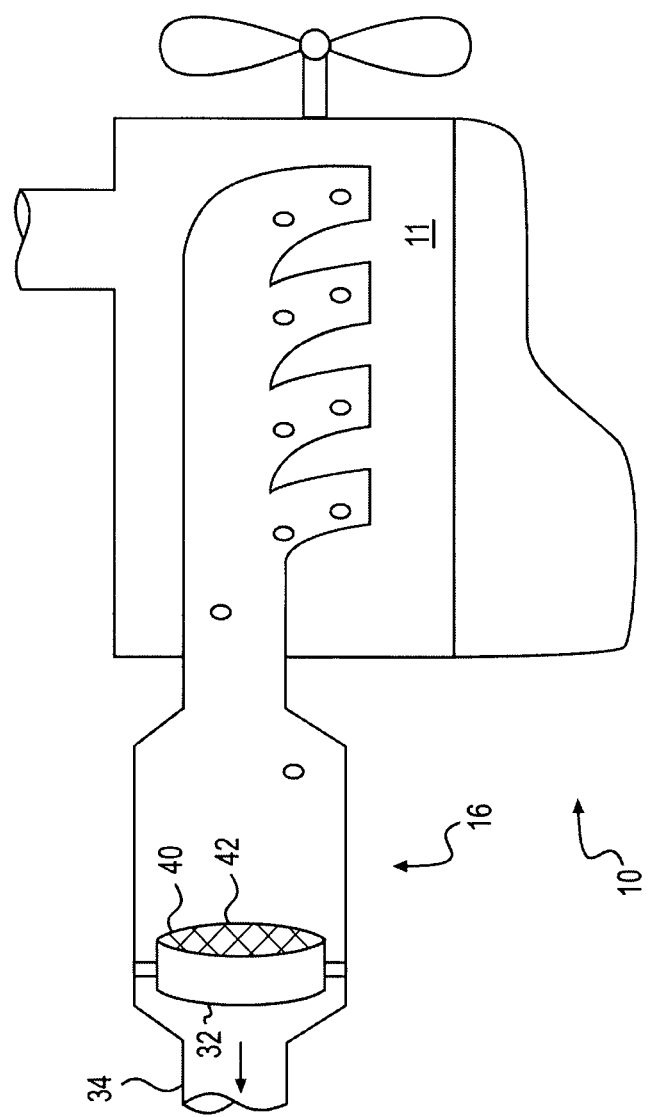

EXHAUST SYSTEM HAVING CATALYTICALLY ACTIVE PARTICULATE FILTER

TECHNICAL FIELD

The present disclosure relates generally to an exhaust system and, more particularly, to an exhaust system having a catalytically active particulate filter.

BACKGROUND

Internal combustion engines, including diesel engines, gasoline engines, natural gas engines, and other engines known in the art exhaust a complex mixture of chemical compounds. The chemical compounds may be composed of gaseous compounds, which may include nitrogen oxides (NOx), and solid particulate matter, which may include soot. Due to increased attention on the environment, exhaust emission standards have become more stringent, and the amount of pollutants emitted to the atmosphere from an engine may be regulated depending on the type of engine, size of engine, and/or class of engine.

One method that has been implemented by engine manufacturers to comply with the regulation of particulate matter exhausted to the environment has been to remove the matter from the exhaust flow of an engine with particulate filters. To comply with the regulation of gaseous compounds, manufacturers have included various catalysts within the filters to purify the exhaust gas from the engine before emitting the gas to the atmosphere. These catalysts convert harmful NOx into innocuous constituents such as elemental nitrogen ($N_2$) and oxygen ($O_2$). The catalysts include base metal oxides, molten salts, and/or precious metals.

One method of providing a catalyzed particulate filter is disclosed in U.S. Pat. No. 4,912,077 (the '077 patent), issued to Lachman et al. on Mar. 27, 1990. The '077 patent incorporates catalytic materials into the filter by constructing a composite structure consisting of a catalytically active precious metal and/or base metal that becomes catalytically active upon oxidation. The structure of the '077 patent is fabricated by mixing catalytically active and structural powders with binders to form a plastic mass. The method further includes shaping the plastic mass into a desired geometry, drying the mass to remove the water content, and sintering to form a unitary composite body. The catalytically active materials of the '077 patent include chromium, cobalt, copper, iron, manganese, molybdenum, nickel, niobium, tantalum, titanium, tungsten, vanadium, zinc, zirconium, gold, iridium, osmium, palladium, platinum, rhenium, rhodium, ruthenium, and silver.

Although the method of the '077 patent may provide a catalytically active structure capable of decomposing NOx gases, the composite structure may have a low porosity, resulting in a high pressure drop across the filter, decreased filtering efficiency, and decreased engine performance. In addition, some of the materials of the '077 patent may require high activation temperatures, resulting in inefficient decomposition of NOx gases. Furthermore, the catalytic materials of the '077 patent may be costly and/or unsuited to the high temperature environment of a particulate filter.

The disclosed exhaust system is directed to overcoming one or more of the problems set forth above.

SUMMARY OF THE INVENTION

In one aspect, the present disclosure is directed to a catalyst containing a ternary nitride; and at least one of gold, osmium, iridium, palladium, rhodium, rhenium, ruthenium, or cesium.

In another aspect, the present disclosure is directed to a catalyst containing a ternary nitrate, wherein the ternary nitride contains at least one of tantalum oxynitride, magnesium boron nitride, samarium sulfur nitride, or magnesium silicon nitride.

In another aspect, the present disclosure is directed to a filter containing a base material and a catalyst integrated with the base material. The catalyst contains a ternary nitride and at least one of gold, osmium, iridium, palladium, rhodium, rhenium, ruthenium, or cesium.

BRIEF DESCRIPTION OF THE DRAWINGS

FIG. 1 is a diagrammatic illustration of an engine having a catalytically active filter according to an exemplary disclosed embodiment.

DETAILED DESCRIPTION

FIG. 1 illustrates an exemplary power source 10. Power source 10 may include an engine 11 such as, for example, a diesel engine, a gasoline engine, a gaseous fuel-powered engine, or any other engine apparent to one skilled in the art. Power source 10 may, alternatively, include a non-engine source of power such as a furnace. Power source 10 may include an exhaust system 16 that directs exhaust away from engine 11.

Exhaust system 16 may include components that direct and/or treat exhaust from engine 11. In particular, exhaust system 16 may include a particulate filter 32 and an exhaust outlet 34. The exhaust from engine 11 may pass through particulate filter 32 to exhaust outlet 34 before discharge to the atmosphere. It is contemplated that additional emission-controlling devices may be included within exhaust system 16, if desired.

Particulate filter 32 may be placed downstream of engine 11 to remove particulates from the exhaust. Particulate filter 32 may contain a filter material 40 that may include electrically conductive coarse mesh elements that have been compressed and/or sintered together under pressure. It is further contemplated that filter material 40 may, alternatively, include electrically non-conductive coarse mesh elements such as, for example, porous elements formed from a ceramic material or a high-temperature polymer. It is also contemplated that more than one particulate filter 32 may be included within exhaust system 16 and disposed in series or parallel relation.

A catalyst 42 may be applied as a wash coating to filter material 40 in a conventional manner. In another embodiment, catalyst 42 may be combined with filter material 40 to form an alloy fiber. For example, catalyst 42 may be added to an alloy such as FeCrAlY to form a metallic fiber alloy. The catalytically active alloy fiber may then be used to form a coarse mesh web element with a thickness of about 0.3-3 mm thick. Multiple layers of web elements may be combined to form filter material 40 with a porosity of about 70-99%. The high porosity achieved by using web elements results in a low pressure drop across filter 32 and minimal impact on engine performance. The web elements may be sintered together under pressure, or in an alternate embodiment, may be used as a non-sintered metal fiber web filter. It is further considered that the mesh layers may vary in their material composition.

Catalyst 42 may be an intermetallic material configured to decompose NOx and may be formed by modifying a ternary nitride such as tantalum oxynitride (TaON), magnesium boron nitride ($MgB_9N$), samarium sulfur nitride ($Sm_3S_3N$), or magnesium silicon nitride ($MgSiN_2$) to include one or more of the following elements: gold (Au), osmium (Os), iridium (Ir), palladium (Pd), rhodium (Rh), rhenium (Re), ruthenium (Ru), and/or cesium (Cs). For example, catalyst 42 may be represented as TaXON, where X represents one or more of the elements listed above. It is further considered that a ternary nitrides alone (i.e. without the addition of the above mentioned elements, or other compounds) the may function as a catalyst. Several possible catalysts are listed in Table 1 as examples, however other combinations are possible.

TABLE 1

|  |  | Ternary Nitride | | | |
|---|---|---|---|---|---|
|  |  | TaON | MgB$_9$N | Sm$_3$S$_3$N | MgSiN$_2$ |
| Element | Au | TaAuON | MgAuB$_9$N | Sm$_3$AuS$_3$N | MgAuSiN$_2$ |
|  | Os | TaOsON | MgOsB$_9$N | Sm$_3$OsS$_3$N | MgOsSiN$_2$ |
|  | Ir | TaIrON | MgIrB$_9$N | Sm$_3$IrS$_3$N | MgIrSiN$_2$ |
|  | Pd | TaPdON | MgPdB$_9$N | Sm$_3$PdS$_3$N | MgPdSiN$_2$ |
|  | Rh | TaRhON | MgRhB$_9$N | Sm$_3$RhS$_3$N | MgRhSiN$_2$ |
|  | Re | TaReON | MgReB$_9$N | Sm$_3$ReS$_3$N | MgReSiN$_2$ |
|  | Ru | TaRuON | MgRuB$_9$N | Sm$_3$RuS$_3$N | MgRuSiN$_2$ |
|  | Cs | TaCsON | MgCsB$_9$N | Sm$_3$CsS$_3$N | MgCsSiN$_2$ |

Intermetallic catalyst 42 may be synthesized from the ternary nitride and elements listed above using, for example, low-temperature liquid synthesis such as described by Schaak et al., in the *Journal of American Chemical Society* 127, 3506-3515 (2005), low temperature solid synthesis such as described by Henkes et al., in *Chem. Mater.* 567-571 (2006), or any other method known in the art for synthesizing intermetallic nanoparticles.

Catalyst 42 may enable direct NO decomposition according to the following reaction process:

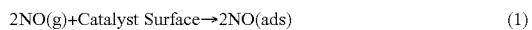
$$2NO(g) + \text{Catalyst Surface} \rightarrow 2NO(\text{ads}) \tag{1}$$

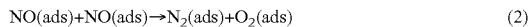
$$NO(\text{ads}) + NO(\text{ads}) \rightarrow N_2(\text{ads}) + O_2(\text{ads}) \tag{2}$$

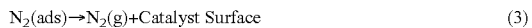
$$N_2(\text{ads}) \rightarrow N_2(g) + \text{Catalyst Surface} \tag{3}$$

$$O_2(\text{ads}) \rightarrow O_2(g) + \text{Catalyst Surface} \tag{4}$$

Reaction (1) describes the adsorption of NOx gas onto the surface of catalyst 42, Reaction (2) describes the formation of adsorbed N2 and O2 from NO on the surface of catalyst 42, and Reactions (3) and (4) describe the desorption of N2 and O2 from the surface of catalyst 42, as environmentally friendly gases.

In addition, catalyst 42 may enable direct $NO_2$ decomposition according to the following reaction process, the steps of which are similar to those described above:

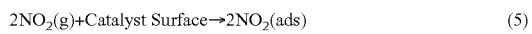
$$2NO_2(g) + \text{Catalyst Surface} \rightarrow 2NO_2(\text{ads}) \tag{5}$$

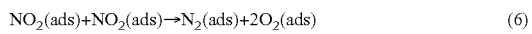
$$NO_2(\text{ads}) + NO_2(\text{ads}) \rightarrow N_2(\text{ads}) + 2O_2(\text{ads}) \tag{6}$$

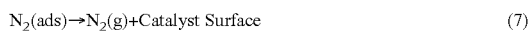
$$N_2(\text{ads}) \rightarrow N_2(g) + \text{Catalyst Surface} \tag{7}$$

$$2O_2(\text{ads}) \rightarrow 2O_2(g) + \text{Catalyst Surface} \tag{8}$$

INDUSTRIAL APPLICABILITY

The disclosed catalytically active particulate filter may be applicable to any combustion-type device, such as an engine or a furnace, where the reduction of NOx engine emissions is desired. The disclosed catalytically active filter may facilitate the decomposition of harmful NOx gases into environmentally friendly $N_2$ and $O_2$ at temperatures within the normal operating range of a diesel particulate filter (DPF). In addition, the disclosed catalytically active filter may function without substantially impacting flow of exhaust through the DPF. Operation of the catalytically active filter will now be explained.

Atmospheric air may be drawn into a combustion chamber of engine 11. Fuel may be mixed with the air before or after entering the combustion chamber. This fuel-air mixture may be combusted by engine 11 to produce mechanical work and an exhaust flow containing solid particulate matter and gaseous compounds, including NOx.

The exhaust gas flow may be directed to particulate filter 32 where particulate matter entrained with the exhaust flow may be filtered. As the exhaust gas passes through particulate filter 32, NOx gases may come into contact with catalytic material 42. Catalytic material 42 may be of the form TaON, MgB$_9$N, Sm$_3$S$_3$N, MgXSiN$_2$, TaXON, MgXB$_9$N, Sm$_3$XS$_3$N, or MgXSiN$_2$, where X represents one or more of the elements Au, Os, Ir, Pd, Rh, Re, Ru, and Cs. As NOx gases are exposed to the surface of catalytic material 42, they may become adsorbed and react to form adsorbed $O_2$ and $N_2$, as shown above by Reactions (1), (2), (5), and (6). The $O_2$ and $N_2$ may become desorbed from the surface of the catalytic material, as shown above by Reactions (3), (4), (7), and (8).

Using conventional catalysts, the desorption of Reactions (3), (4), (7), and (8) may require activation temperatures as high as 570° F. At lower temperatures, $N_2$ and $O_2$ may remain adsorbed on the surface of catalyst 42 and the surface of catalyst 42 may become saturated with these molecules, unable to adsorb additional NOx molecules for decomposition. However, catalyst 42 of the present disclosure may enable desorption to occur at temperatures less than about 210° F., increasing the operating range at which NOx decomposition may occur.

Several advantages may be associated with the catalytically active filter of the present disclosure. Specifically, the disclosed system may be an inexpensive, effective solution for purifying NOx gases produced during the combustion cycle. The disclosed catalytically active filter may provide a catalyst capable of withstanding the high temperatures of a DPF environment without requiring excessive temperatures in order to maintain its effectiveness. Furthermore, the disclosed catalytically active filter may provide these benefits without impacting flow through the DPF.

It will be apparent to those skilled in the art that various modifications and variations can be made to the disclosed catalytically active filter. Other embodiments will be apparent to those skilled in the art from consideration of the specification and practice of the disclosed exhaust treatment system. It is intended that the specification and examples be considered as exemplary only, with a true scope being indicated by the following claims and their equivalents.

What is claimed is:

1. A catalyst, comprising:
   a ternary nitride; and
   at least one of gold, osmium, iridium, palladium, rhodium, rhenium, ruthenium, or cesium,
   wherein said catalyst catalytically decomposes NOx.

2. The catalyst of claim 1, wherein the ternary nitride is tantalum oxynitride.

3. The catalyst of claim 1, wherein the ternary nitride is magnesium boron nitride.

4. The catalyst of claim 1, wherein the ternary nitride is samarium sulfur nitride.

5. The catalyst of claim 1, wherein the ternary nitride is magnesium silicon nitride.

6. A filter, comprising:
   a base material; and a catalyst integrated with the base material, wherein the catalyst contains:
a ternary nitride; and
at least one of gold, osmium, iridium, palladium, rhodium, rhenium, ruthenium, or cesium,
wherein said catalyst catalytically decomposes NOx.

7. The filter of claim 6, wherein the base material is FeCrAlY.

8. The filter of claim 6, wherein the base material and the catalyst are mixed to form an alloy.

9. The filter of claim 8, wherein the alloy forms metal fiber.

10. The filter of claim 9, wherein the metal fiber wire forms a web.

11. The filter of claim 10, wherein the web has a porosity of about 70-99%.

12. The filter of claim 10, wherein the web is sintered.

13. The filter of claim 6, wherein the catalyst is applied as a coating to the base material.

14. The filter of claim 13, wherein the catalyst is applied to FeCrAlY.

15. The filter of claim 6, wherein the ternary nitride contains at least one of tantalum oxynitride, magnesium boron nitride, samarium sulfur nitride, or magnesium silicon nitride.

16. An exhaust treatment system comprising:
an engine configured to produce power and a flow of exhaust; and
a particulate filter situated to receive the flow of exhaust from the engine, wherein the filter contains:
a base material; and
a catalyst integrated with the base material, wherein the catalyst contains:
a ternary nitride; and
at least one of gold, osmium, iridium, palladium, rhodium, rhenium, ruthenium, or cesium,
wherein said catalyst catalytically decomposes NOx.

17. The exhaust treatment system of claim 16, wherein the ternary nitride contains at least one of tantalum oxynitride, magnesium boron nitride, samarium sulfur nitride, or magnesium silicon nitride.

18. The exhaust treatment system of claim 16, wherein:
the base material and the catalyst are mixed to form an alloy fiber; and
the alloy fiber forms a web.

* * * * *